United States Patent
Na

(10) Patent No.: US 8,281,284 B2
(45) Date of Patent: Oct. 2, 2012

(54) METHOD AND SOFTWARE FOR EDITING WEB DOCUMENTS

(75) Inventor: Gun-Pyo Na, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 1029 days.

(21) Appl. No.: 12/247,948

(22) Filed: Oct. 8, 2008

(65) Prior Publication Data
US 2009/0094579 A1 Apr. 9, 2009

(30) Foreign Application Priority Data
Oct. 8, 2007 (KR) ........................ 10-2007-0100979

(51) Int. Cl.
*G06F 9/44* (2006.01)

(52) U.S. Cl. ......... 717/110; 717/105; 717/109; 717/113

(58) Field of Classification Search ........................ None
See application file for complete search history.

(56) References Cited

U.S. PATENT DOCUMENTS
7,340,673 B2 * 3/2008 Malone ........................ 715/255

FOREIGN PATENT DOCUMENTS
JP 2005537540 12/2005

* cited by examiner

*Primary Examiner* — Chuck Kendall
(74) *Attorney, Agent, or Firm* — H.C. Park & Associates, PLC

(57) ABSTRACT

Disclosed is a method of editing text using a web-based text editor. The method comprises opening a document using a web-based text editor; receiving a first user input for selecting a block of text in the document; in reply to the first user input, inserting, into a source code of the document, a first temporary node before the selected block and a second temporary node after the selected block; receiving a second user input for applying an attribute to the selected block; and in reply to the second user input, adding an attribute node between the first and second temporary nodes of the source code so as to apply the attribute to at least part of the block of the document.

20 Claims, 17 Drawing Sheets

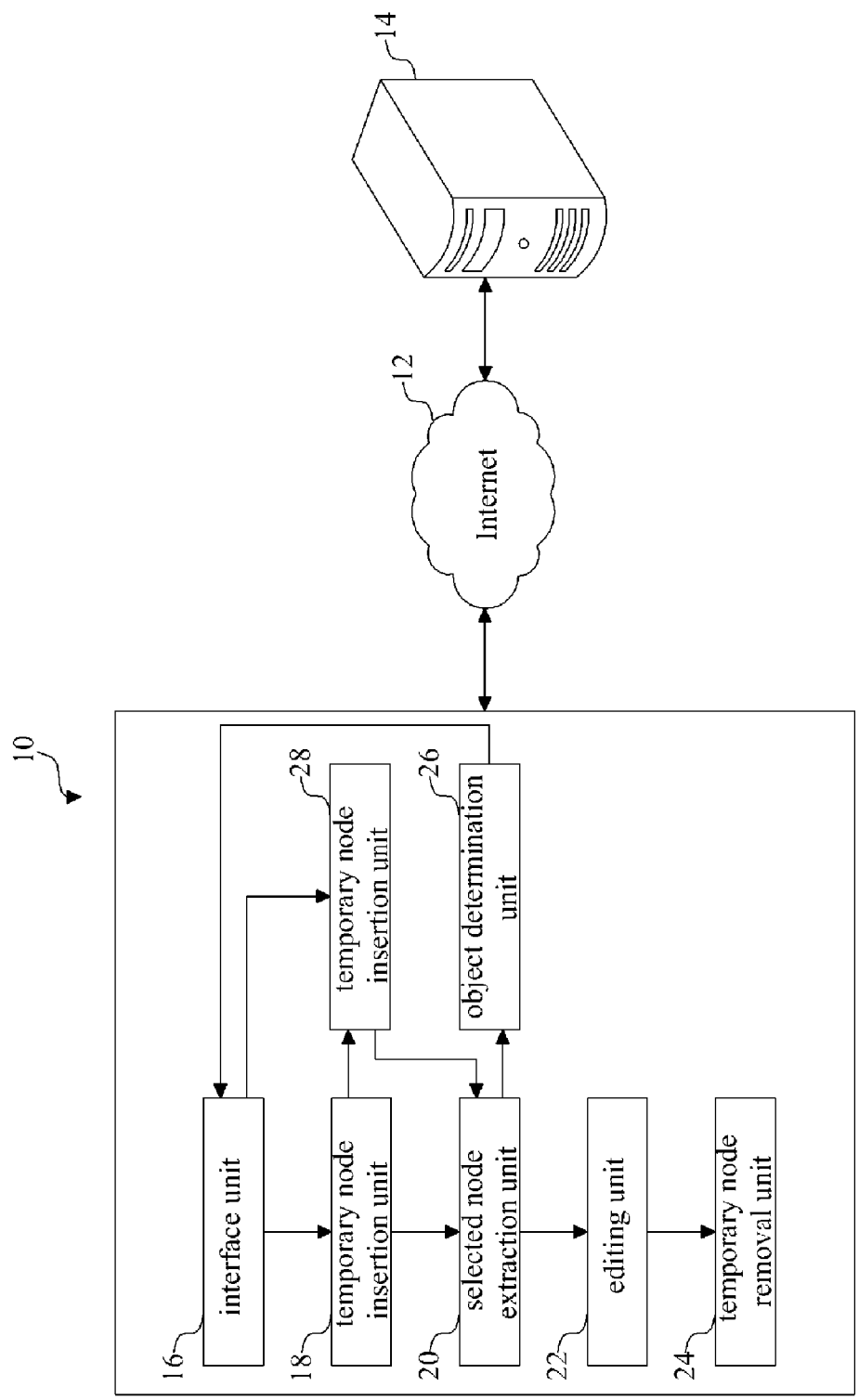

FIG.2

| | | |
|---|---|---|
| 2a | Orginal text | Contents of the text are followings |
| | Source | Contents of the text are followings |
| | Edition text | **Contents of *the text* are followings** |
| | Source | Contents of <span style "first edition attribute">the text</span> are followings |
| 2b | Orginal text | **Contents of *the text* are followings** |
| | Source | Contents of <span style "second edition attribute"> the text</span> are followings |
| 2c | Edition text1 | **Contents of *the text* are followings** |
| | Source1 | <span style "first edition attribute"> Contens of <span style "second edition attribute"> the text </span></span> are followings.</span> |
| 2d | Edition text2 | **Contents of *the text* are followings** |
| | Source2 | <span style "first edition attribute"> Contens of </span><span style"first edition attribute"> the text </span><span style "first edition attribute"> are followings.</span> |
| 2e | Edition text1 | **Contents of *the* text are followings** |
| | Source1 | <span style"first edition attribute"> Contens of <span style "second edition attribute"> the </span>text</span> are followings. |
| 2f | Edition text2 | **Contents of *the* text are followings** |
| | Source2 | <span style "first edition attribute">Contens of </span><span style"second edition attribute"> the</span><span style"first edition attribute">text</span> are followings. |

FIG. 4A

Highlighting text

Highlighting text with          table

| | | |
|---|---|---|
| Font▼  Size ▼ a a *a* a̶ a ⓐ ≡ ≡ ≡ ≡ ✱ 🔍 URL ᵃᵇᶜSpell Checking ⓒ ■ »  | | ☐ html ☐Summary |
| Pop Star Cool K Indicted for Evading Milita  50% / 80% / 100% / 120% / 150% / 180% / 200% ry Service | | Attach File |
| | | ☐ Photo |
| | | ⊙ Moving Image |
| Prosecutors Thursday indicted Cool K, a music  irector and model, on| | | ⊞ File |
| charges of evading military service by feigni   bloo, according to Yonhap | | ∞ Media |
| | | ⊙ Music |
| News. Cool K, whose real name is Kim Doh-kyung, was enlisted for the | | ♡ Cartoon |
| | | ♬ Picture |
| 24-month compulsory conscription in his initial medical checkup but was later | | Attach Information |
| | | Book DB |
| switched to civil service usually reserved for those with prescribed illnesses or | | Movie DB |
| | | Drama DB |
| whose presence in the military may affect others' health, investigators at the Seoul | | Music DB |
| | | Product DB |
| Central District Prosecutors' Office was quoted as saying. | | Person DB |
| | | Weather |

FIG.8A

Screen

| Font▾ | Size▾ | a a a a a a a | ≡ ≡ ≡ ≡ ≡ ≡ ≡ | URL | ☺ | ▦ | ※ | ⌕ | ✓ | text 1 😊 text 2
text 3
text 4

| | Layout |
|---|---|
| Attach File | |
| ☐ Photo | |
| ▦ Map | |
| ⊙ Moving Image | |
| ⊞ File | |
| ⊙ Music | |
| ⌕ Cartoon | |
| ♪ Picture | |
| DB Information | |
| Book DB | |
| Movie DB | |
| Drama DB | |
| Music DB | |
| Product DB | |
| Person DB | |
| Encyclopedia DB | |

HTML Source

\<P\>text 1\<IMG src="http://blogimgs.naver.com/blog/mylog/post/emoticon/1_06.gif"\>text 2\</P\>
\<P\>text 3\</P\>
\<P\>text 4\</P\>

```
NodeRange Initialization Section
        //Apply common function
        NodeRangeCommon.apply(this);

//Apply appropriate code for each browser through browser determination
        if(paramDoc.selection)
                NodeRangeIE.apply(this);
        else
                NodeRangeIE.apply(this);
```

FIG.9B

```
// Insert HTML codes of temporary nodes into start and end positions of region.
  region_start = selected region
  region_end = selected region                                                    } 30
  region_start = start position of region_start
  region_end = end position of region_end actual temporary node_start = new start node
  insert actual temporary node_start into region_start    } 32 actual temporary node_end = new start node
  insert actual temporary node_end into region_end        } 34 ancestor node = ancestor node including both actual temporary node_start and —— 36
actual temporary node_end all nodes[] = all nodes belonging to ancestor node in region = false
extracted node = []
for node in all nodes []
        // start position of region is found
        if node == actual temporary node_start, then
                in region = true
        // end position of region is found
        if node == actual temporary node_end, then      } 38
                in region = false
                break;
        // add node if it is between start and end positions
        if in region == true
                extracted node.append(node);

actual temporary node_start.delete   } 40
actual temporary node_end.delete return to extract node
```

FIG.9C

```
// Insert HTML codes of temporary nodes into start and end positions of region.
  region_start = selected region
  region_end = selected region
  region_start = start position of region_start
  region_end = end position of region_end virtual temporary node_start = new span node                              ⎫
virtual temporary node_start.ID = ID value absent in web document         ⎬ 42
HTML of region_start = HTML of virtual temporary node_start               ⎭ virtual temporary node_end = new span node                                ⎫
virtual temporary node_end.ID = ID value absent in web document           ⎬ 44
HTML of region_end = HTML of virtual temporary node_end                   ⎭

// Retrieve corresponding node object from web document using ID value of inserted   ⎫
     temporary node HTML.                                                            ⎬ 46
actual temporary node_start = node matching virtual temporary node_start.ID in web document
actual temporary node_end = node matching virtual temporary node_end.ID in web document  ⎭ ancestor node = ancestor node including both actual temporary node_start and
actual temporary node_end all nodes[] = all nodes belonging to ancestor node in region = false
extracted node = []
for node in all nodes []
            // start position of region is found
            if node == actual temporary node_start, then
                      in region = true
            // end position of region is found
            if node == actual temporary node_end, then
                      in region = false
                      break;
            // add node if it is between start and end positions
            if in region == true
                      extracted node.append(node);

actual temporary node_start.delete
actual temporary node_end.delete return to extract node
```

FIG.9D

```
for node in selected nodes[]
        if node.className == "storyphoto_layout" then
                            alert("story photo is selected")
                            break;
```

METHOD AND SOFTWARE FOR EDITING WEB DOCUMENTS

CROSS-REFERENCE TO RELATED APPLICATION

This application claims the benefit of Korean Patent Application No. 10-2007-0100979, filed on Oct. 8, 2007, the disclosure of which is hereby incorporated by reference in its entirety.

BACKGROUND

1. Field

The present disclosure relates to processing of documents, and more particularly to a method and software for editing web documents.

2. Discussion of the Related Technology

Along with development of Internet and communication technologies, a variety of services have been provided to users over the Internet. Typical examples of such Internet services include a webmail service and a posting service in an online community, or blog (hereinafter referred to as a "community service"). Users can produce or edit an email or a document (hereinafter referred to as a "web document") to post them over the Internet using a variety of interfaces provided by such webmail or community services. For this end, a web text editor is provided.

The foregoing discussion is to provide general background information, and does not constitute an admission of the prior art.

SUMMARY

One aspect of the invention provides a method of editing text using a web-based text editor. The method comprises: opening a document using a web-based text editor; receiving a first user input for selecting a block of text in the document; in reply to the first user input, inserting, into a source code of the document, a first temporary node before the selected block and a second temporary node after the selected block; receiving a second user input for applying an attribute to the selected block; and in reply to the second user input, adding an attribute node between the first and second temporary nodes of the source code so as to apply the attribute to at least part of the block of the document.

In the foregoing method, the method may further comprise: prior to adding, identifying the first and secondary temporary nodes in the source code. Identifying may comprise scanning the source code from before the first temporary node to after the second temporary node. The method may further comprise identifying a plurality of children nodes between the first and second temporary nodes. Adding the attribute node may comprise inserting the attribute node within each of the plurality of children nodes. Adding the attribute node may comprise replacing, with the attribute node, another attribute node included in one of the plurality of children nodes. The method may further comprise: removing, from one of the plurality of children nodes, another attribute node that is inconsistent with the attribute node.

Still in the foregoing method, the method may further comprise: identifying a node to which the attribute cannot be applied; and generating a notification that the attribute cannot be applied to part of the selected block. The method may further comprise: deleting the first and second temporary nodes from the source code after completion of setting the attribute for the selected block. The attribute may be selected from the group consisting of a font, a font size, italicization, underlining, bolding, coloring text, coloring background, line spacing, and alignment.

Yet in the foregoing method, the source code may be in the HTML format. The first temporary node may comprise a start or end tag. Adding the attribute node may comprise inserting at least one tag indicative of the attribute. The web-based text editor may be run along with a web browser. The web browser may be selected from the group consisting of Internet Explorer, Firefox, Mozilla, Safari, Netscape, Opera, Google Chrome and AOL Explorer. Inserting the first and second temporary nodes may further comprise: determining which web browser is being run along with the web-based text editor; and causing to insert the first and second temporary nodes differently depending on determination. The method may further comprise sending the document to a remote server that operates a web-based text editing service.

Another aspect of the invention provides software configured to cause a computing terminal to perform the foregoing method. In the foregoing software, the software may be configured to be operated with a web browser. The method may further comprise: identifying a plurality of children nodes between the first and second temporary nodes; and wherein adding the attribute node comprises replacing, with the attribute node, another attribute node included in one of the plurality of children nodes.

It is an aspect of the present invention to provide a method and apparatus for editing web documents, which directly acquires an object of a region, which a user has selected in a web document for freely editing the web document, to enable editing of the object of the region selected by the user.

It is another aspect of the present invention to provide a method and apparatus for editing web documents, which directly acquires and edits an object of a region, which a user has selected in a web document, thereby providing a variety of editing functions that have not been provided by web browsers.

It is a further aspect of the present invention to provide a method and apparatus for editing web documents, which can operate in conjunction with web browsers while minimizing the number of times the type of a web browser is determined.

An aspect of the present invention provides a method for editing web documents, the method comprising receiving region information of a first region, which a user has selected for editing in a web document, and a first editing request for the first region from the user, inserting first and second temporary nodes respectively into start and end positions of the first region based on the first region information, extracting all nodes included between the first and second temporary nodes, and applying a first editing attribute corresponding to the first editing request to at least one of the extracted nodes.

Here, the step of extracting all nodes includes acquiring information of an ancestor node including all nodes between the first and second temporary nodes, scanning all nodes included in the ancestor node until the first temporary node is found, and extracting, if the first temporary node is found, all nodes written after the first temporary node until the second temporary node is found. Here, the ancestor node is a node enclosed within a pair of specific tags including all nodes between the first and second temporary nodes.

On the other hand, at the step of applying the first editing attribute, the first editing attribute is applied to a text node among the extracted nodes. Specifically, the step of applying the first editing attribute includes enclosing a text node among the extracted nodes within a pair of first tags, and assigning the first editing attribute to the pair of first tags. Here, the pair of first tags is a pair of span tags.

In accordance with an embodiment of the present invention, the method may further comprise determining a type of a web browser installed on a user terminal, and calling predetermined function classes for node extraction according to the determined web browser type. Here, when the determined type of the web browser does not support a function to insert the first and second temporary nodes, a temporary node in a source code format is inserted into each of the start and end positions of the first region at the first and second temporary node insertion step.

In accordance with an embodiment of the present invention, the method may further comprise determining whether or not a predetermined specific type of object is included in the extracted node after the node extraction step, and providing, when the specific type of object is included, a user with a message indicating that the specific type of object is included or a message indicating that the first editing request cannot be performed.

In accordance with another aspect of the present invention, there is provided an apparatus for editing web documents, the apparatus comprising an interface unit for receiving region information of a first region, which a user has selected for editing in a web document, and a first editing request for the first region from the user, a temporary node insertion unit for inserting first and second temporary nodes respectively into start and end positions of the first region based on the first region information received by the interface unit, a selected node extraction unit for extracting all nodes included between the first and second temporary nodes, and an editing unit for applying a first editing attribute corresponding to the first editing request to at least one of the extracted nodes.

BRIEF DESCRIPTION OF THE DRAWINGS

The above and other features and other advantages of the present invention will be more clearly understood from the following detailed description taken in conjunction with the accompanying drawings, in which:

FIG. 1 is a schematic block diagram of a web document editing apparatus according to an embodiment of the present invention;

FIGS. 2A to 2F illustrate examples of assignment of an editing attribute to a text node according to an embodiment of the present invention;

FIG. 4A illustrates a result of changing background color of a web document using an example of web document editing apparatus;

FIG. 4B illustrates a result of changing background color of a web document using a web document editing apparatus according to an embodiment of the present invention;

FIG. 5 illustrates a screen captured when line spacing of a web document is adjusted using the web document editing apparatus according to an embodiment of the present invention;

FIGS. 8A to 8F illustrate example screens captured during a procedure for editing a web document according to an embodiment of the present invention; and FIGS. 9A to 9D illustrate source codes for programming the web document editing method according to an embodiment of the present invention.

DETAILED DESCRIPTION OF EMBODIMENTS

Figure 3:
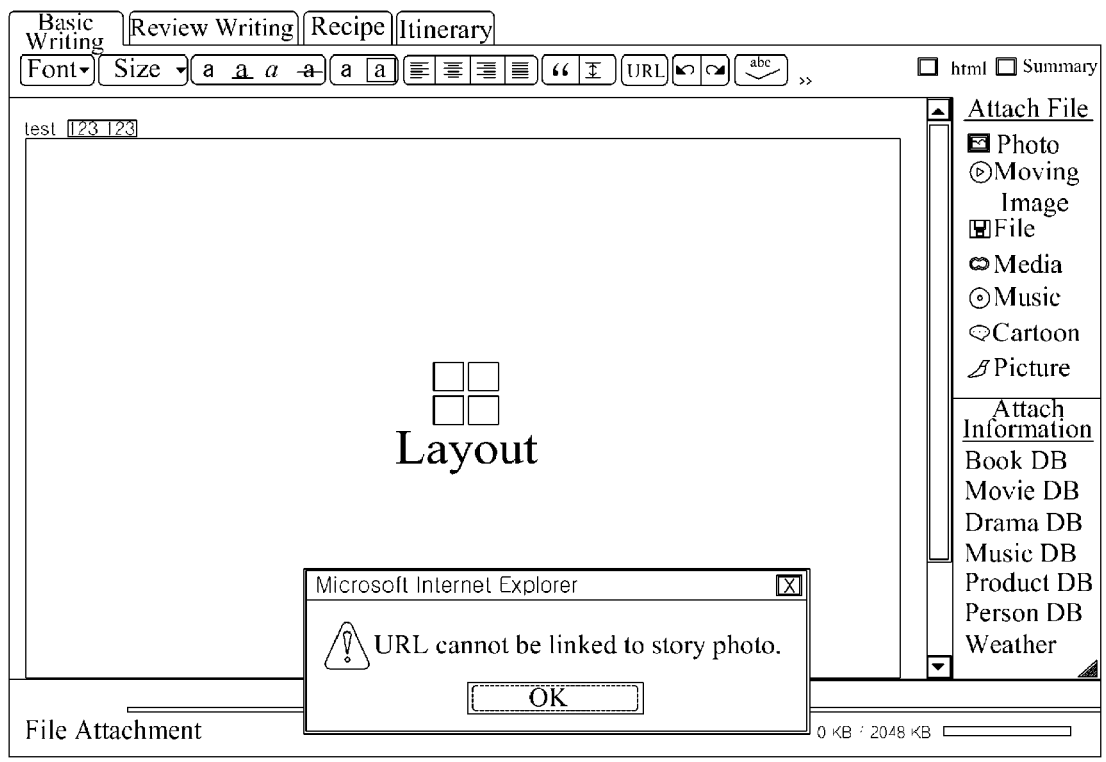
FIG. 3 illustrates a captured screen on which a warning message is displayed when a specific object is included in a selected node.

Embodiments of the present invention will now be described in detail with reference to the accompanying drawings. Here, terms used in the description for describing embodiments are briefly defined before embodiments of the present invention are described. The term "node" refers to a unit of information in a source code of a web document, and includes tags, objects, contents, attribute tags, etc. For example, nodes include a start tag indicating the beginning of an element, an end tag indicating the end of an element, a content node, a text node, an attribute tag or node defining an attribute of a content node or text node. A block of multiple nodes can be collectively referred to as a node, which often times called a parent node while each of the multiple nodes can be called a child node. The "object" refers to a content, such as text, an image, a table, or the like. A content node is some amount of content. A text node is a content node including some amount of text. Typically, a content/text node is interposed between two tag nodes.

Web document editing includes changing size, font, and color of text included in an email produced while a webmail service is used or in text produced while a community service is used. Such web document editing is mostly performed using a web-based What-you-see-is-what-you-get (WYSIWYG) editor (hereinafter referred to as a web editor"). The web editor or web based text editor provides a function to edit an object or content such as a text or image object included in a web document using functions provided by a web browser installed on a user terminal.

However, since functions that the web browser provides to edit objects included in a web document are very limited, the web document editing function provided by the web editor that provides the web document editing function using such a web browser's functions is also limited. For example, although such web editor can change text size or font, it cannot change text line spacing since the web browser does not support a function to change text line spacing. In addition, although such web editor supports the function to change font size, it cannot change font size on a pixel basis since the web browser does not support the function to change font size on a pixel basis and only supports the function to change font size in predetermined units.

Also, such web editor has a web browser determination code inserted into each function for cooperation with each web browser, and it determines which web browser is being used whenever a corresponding function is executed.

FIG. 1 is a schematic block diagram of a web document editing apparatus according to an embodiment of the present invention. As shown, a web document editing apparatus 10, which is installed on a user terminal (not shown), receives a web document editing request issued by a user and performs a function to edit a web document in response to the received web document editing request and then transmits the edited web document to a web server 14 connected to the web document editing apparatus 10 through the Internet 12. The web server 14 is a server that supports web document creation, similar to a blog server or a mail server.

The web document editing apparatus 10 performs a web document editing function by operating in conjunction with a web browser (not shown) installed on the user terminal. The web document editing apparatus 10 includes an interface unit 16, a temporary node insertion unit 18, a selected node extraction unit 20, an editing unit 22, and a temporary node removal unit 24.

The interface unit 16 receives information of a first region that the user has selected for editing in a web document and an editing request for the first region from the user. For example, the interface unit 16 receives information of a region dragged by an input device such as a mouse in a created web document, while receiving an editing request such as, a request to change a font size, a line spacing, or color of the selected region or a request to set a hyperlink therein, from the user.

In an embodiment, the interface unit 16 can determine the type of each web browser installed on the user terminal to call predetermined functions of each browser for node extraction. For example, the interface unit 16 determines whether or not the web browser is Firefox (FF) or Internet Explorer (IE) and calls predetermined functions of each web browser for node extraction.

To accomplish this, in an embodiment of the present invention, functions used for node extraction are mainly divided into a class of functions commonly used by FF and IE, a class of functions dedicated to FF, and a class of functions dedicated to IE.

That is, in the present invention, functions, which are implemented in different methods in FF and IE, among functions used for node extraction, are previously classified into different classes and thus the interface unit 16 determines the type of each browser only once during library initialization without the need to insert a browser determination code into each function and calls an individual function class for each browser and a function class commonly used by each browser so that an appropriate function for each browser is applied to node extraction using the apply method.

Here, functions that are implemented through a different method for each browser for node extraction include an "insertNodeClone(node)" function to insert a start node or a temporary node, which will be described in detail later in a description of the node insertion unit, into a first region, an "isCollasped( )" function to check whether or not the width of the first region is 0, a "defineRange(selstarNode, selEndNode)" function to define a region based on a start node and an end node, and a "getCommonAncestorContainer( )" function to get an ancestor node including the entirety of the first region.

Although FF and IE have been described as the web browser in the above embodiment, it is apparent to those skilled in the art that FF and IE have been described for ease of explanation and the present invention is not limited to these web browsers.

The temporary node insertion unit 18 inserts a first temporary node into a start position of the first region and inserts a second temporary node into an end position of the first region based on first region information received by the interface unit 16. In an embodiment, the temporary node insertion unit 18 can insert the temporary nodes by inserting a pair of span tags into each of the start and end positions in a Hyper Text Markup Language (HTML) source code of the first region selected by the user. That is, the temporary node insertion unit 18 inserts the first temporary node by inserting a pair of span tags into a start position of the first region and inserting a pair of span tags into an end position of the first region.

No attribute is assigned to each span tag of the inserted pairs of span tags since the pairs of span tags are inserted simply to define the insertion of the temporary nodes indicating the start and end positions. However, specific text can be inserted into each span tag to indicate that the node is a temporary node.

The selected node extraction unit 20 extracts all nodes between the first and second temporary nodes that the temporary node insertion unit 18 has inserted into the start and end positions of the first region and stores the extracted nodes in a temporary storage region (not shown). Specifically, the selected node extraction unit 20 extracts selected nodes by acquiring an ancestor node including the entirety of the first region selected by the user, sequentially scanning all descendant nodes included in the ancestor node until the first temporary node is found, and extracting, if the first temporary node is found, all descendant nodes written after the first temporary node until the second temporary node is found. Here, the ancestor node can be acquired through the "getCommonAncestorContainer( )" function that is called by the interface unit 16.

The temporary node insertion and selected node extraction functions can be performed when the web browser supports the node insertion function as in FF. However, the temporary node insertion unit 18 cannot insert temporary nodes using the above method when the web browser does not support the node insertion function as in IE.

Accordingly, the temporary node insertion unit 18 inserts a temporary node in a source code format into each of the start and end positions of the first region when the web browser identified by the interface unit 16 is a web browser that does not support the node insertion function as in IE. To accomplish this, the web document editing apparatus 10 according to an embodiment of the present invention further includes an object determination unit 26 that previously generates and assigns a first identifier to a temporary node in a source code format to be inserted into the start position of the first region and generates and assigns a second identifier to a temporary node in a source code format to be inserted into the end position of the first region. Here, it is preferable that the object determination unit 26 generate first and second identifiers that are different from those assigned to other nodes in the web document.

Through these identifiers, the web document editing apparatus 10 recognizes the temporary node in a source code format with the first identifier assigned thereto as the first temporary node and recognizes the temporary node in a source code format with the second identifier assigned thereto as the second temporary node.

The selected node extraction unit 20 then extracts selected nodes by sequentially scanning all descendant nodes included in the ancestor node until the first temporary node is found and extracts, if the first temporary node is found, all descendant nodes written after the first temporary node until the second temporary node is found.

The editing unit 22 edits a text object in the first region selected by the user by applying a first editing attribute corresponding to a first editing request issued by the user to each text node among the selected nodes extracted by the selected node extraction unit 20. In an embodiment, the editing unit 22 edits a text object included in the first region selected by the user by enclosing each text node among the selected nodes within a pair of span tags and assigning a first editing attribute to the span tags.

For example, as shown in FIG. 2A, when a user selects text "the text" from text "Contents of the text are followings." and generates a first editing request to change font type of the selected text, the editing unit 22 edits the selected text node by enclosing the selected text within a pair of span tags in an HTML source code of the selected text node and assigning a first editing attribute to the span tags such that the edited text node is "Contents of <span style="first editing attribute">the text</span> are followings.".

On the other hand, when another editing attribute has already been assigned to a text region in a text node selected to assign a new editing attribute, the editing unit 22 does not collectively enclose the selected text region within span tags corresponding to the new editing attribute but instead separates the selected text node into a plurality of text nodes with respect to span tags corresponding to the editing attribute that has already been assigned and converts the editing attribute that has already been assigned into the new editing attribute for each separated text node, to which the editing attribute has already been assigned, and assigns the new editing attribute to each separated text node to which the editing attribute has not been assigned.

Here, the previously assigned editing attribute and the newly assigned editing attribute are the same type of editing attributes. For example, the previously assigned editing attribute and the newly assigned editing attribute are all associated with font color change or font size change.

That is, the editing unit 22 edits the selected text nodes by converting the second editing attribute assigned to the second span tags into the first editing attribute for each text node, which is enclosed within the second span tags, among the selected text nodes and enclosing each text node, which is not enclosed within the second span tags, within a pair of first span tags and then assigning the first editing attribute to the first span tags.

For example, as shown in FIG. 2B, in the case where the user selects a text node "Contents of the text are followings." while generating a first editing request for the selected text node, a source code of the selected text node before a first editing attribute is assigned is "Contents of <span style="second editing attribute">the text</span>are followings." since a second editing attribute has already been assigned to a text region "the text" in the selected text node.

Here, if the entirety of the selected text node is enclosed within span tags although the second editing attribute has already been assigned to a text region in the selected node as shown in FIG. 2C, the resulting source code is "<span style="first editing attribute">Contents of <span style="second editing attribute">the text</span>are followings.</span>" so that the first editing attribute does not affect the text region to which the second editing attribute has already been applied, thereby failing to achieve a desired result.

Accordingly, in this case, the editing unit 22 edits the selected text node by separating the selected text node into three text nodes "Contents of", "the text", and "are followings" with respect to second span tags, enclosing each of the text nodes "Contents of" and "are followings", which have not been enclosed within the second span tags, within a pair of first span tags, assigning the first editing attribute to the pair of first span tags, and then converting the second editing attribute, which has been assigned to the text node "the text" enclosed by the second span tags, into the first editing attribute as shown in FIG. 2D.

On the other hand, in the case where the user selects a text region "Contents of the" in the text node as shown in FIG. 2B while generating a first editing request, if the entirety of the selected region "Contents of the" is enclosed within a pair of first span tags, the resulting source code is "<span style="first editing attribute">Contents of<span 14 style="second editing attribute">the</span>text</span>are followings." as shown in FIG. 2E, thereby failing to achieve a desired result.

Accordingly, in this case, the editing unit 22 separates the selected text node into two text nodes "Contents of" and "the" with respect to second span tags and encloses the text node "Contents of", which has not been enclosed within the second span tags, within a pair of first span tags, and then assigns the first editing attribute to the pair of first span tags. On the other hand, since the text node "the" has not been completely enclosed within a pair of second span tags although the second editing attribute has been assigned to the text node "the", the editing unit 22 encloses the text node "the" within a pair of first span tags, similar to the text node "Contents of", and assigns the first editing attribute to the text node "the" while leaving the second span tags unchanged.

The temporary node removal unit 24 removes the first and second temporary nodes inserted by the temporary node insertion unit 18 from the first region. The temporary nodes inserted by the temporary node insertion unit 18 may not be removed since the temporary nodes are not invisible to the user. Thus, the web document editing apparatus 10 may selectively include the temporary node removal unit 24.

On the other hand, the web document editing apparatus 10 according to an embodiment of the present invention further includes an identifier generation unit 28 for determining whether or not a predetermined specific object is included in a node extracted by the selected node extraction unit 20. When it is determined by the identifier generation unit 28 that the specific object is included in the selected node, the interface unit 16 provides the user with a message indicating that the specific object is included in the selected node or a message indicating that the first editing request issued by the user cannot be performed on the selected node.

For example, when it is determined by the identifier generation unit 28 that an object such as a story photo is included in the selected node, the interface unit 16 may provide the user with a warning message indicating that a hyperlink cannot be established in the first region selected by the user as shown in FIG. 3.

As described above, the web document editing apparatus according to an embodiment of the present invention does not only edit a web document using the editing function provided by the web browser but also can edit the web document by directly accessing a region that the user has selected in the web document, thereby providing a variety of editing functions that cannot be provided by typical web document editing apparatuses using web browsers.

FIG. 4A shows a web document editing apparatus operating in conjunction with a web browser such as FF that changes not only text color but also background color when a request to change background color is issued. However, as shown in FIG. 4B, the web document editing apparatus according to an embodiment of the present invention can change the color of only a text portion among a region, which a user has selected for editing, since the apparatus performs editing by directly accessing the region selected by the user.

In addition, a typical web document editing apparatus cannot adjust line spacing during a process of editing a web document since the web browser does not support a line spacing adjustment function. As shown in FIG. 5, the web document editing apparatus according to an embodiment of the present invention can also adjust line spacing of a web document since the apparatus performs editing by directly accessing the region selected by the user.

Figure 6A:
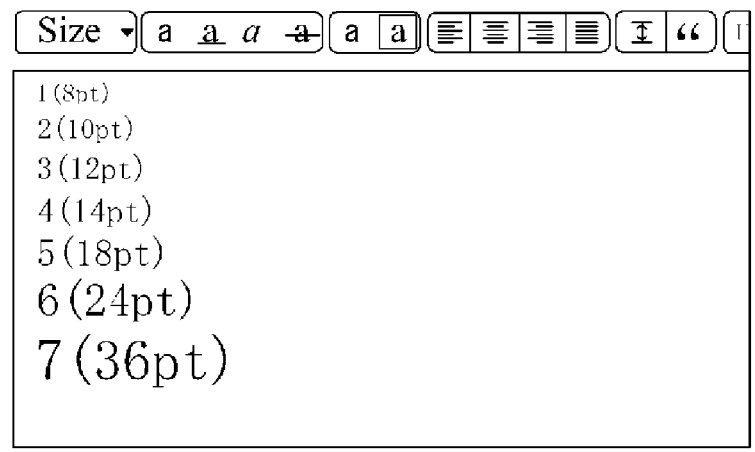
FIG. 6A illustrates a menu for adjusting font size in an example of web document editing apparatus.
Figure 6B:
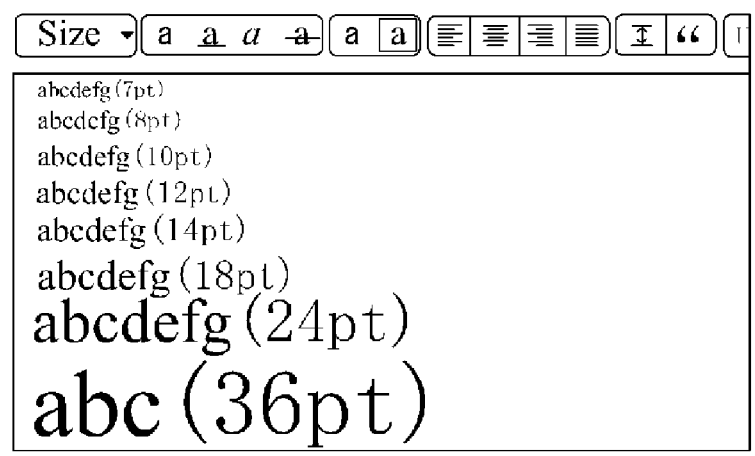
FIG. 6B illustrates a menu for adjusting font size in a web document editing apparatus according to an embodiment of the present invention.

Further, FIG. 6A shows a web document editing apparatus that cannot adjust font size on a pixel basis and can only adjust font size to specific sizes defined in the web browser. As shown in FIG. 6B, the web document editing apparatus according to an embodiment of the present invention can adjust font size on a pixel basis and thus can adjust font size to various sizes since the apparatus performs editing by directly accessing the region selected by the user.

Figure 7:
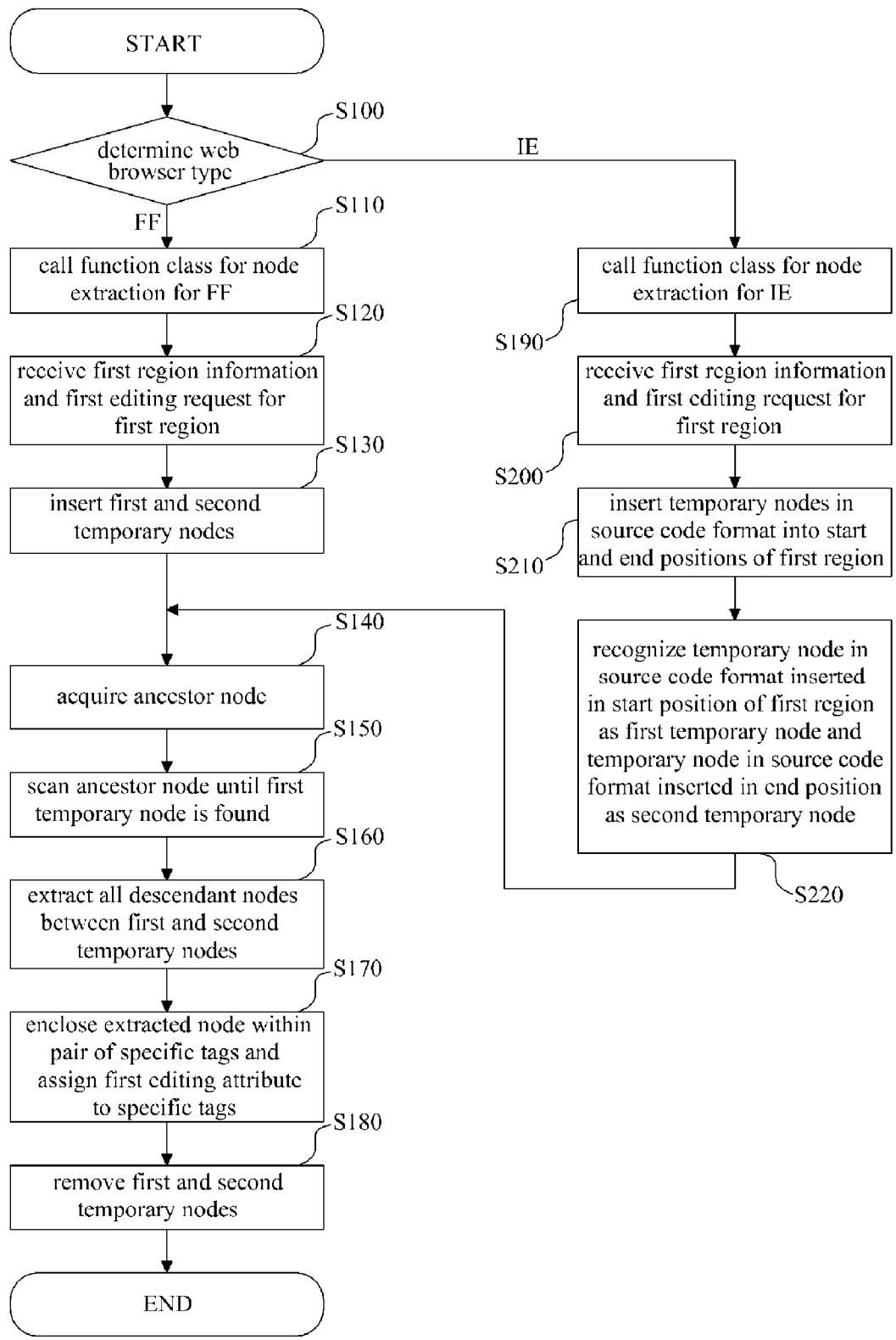
FIG. 7 is a flow chart illustrating a web document editing method according to an embodiment of the present invention.

A method for editing web documents using the web document editing apparatus described above will now be described in detail with reference to FIG. 7. First, the type of a web browser installed on a user terminal is determined during library initialization (step 100). In an embodiment, the type of the web browser may include FF or IE. If it is determined at step 100 that the web browser is FF, a function class for node extraction for FF is called (step 110). Here, it is preferable that a class of functions commonly used by web browsers be called together with the function class for node extraction for FF.

Thereafter, information of a first region that a user has selected for editing in a web document and an editing request for the first region are received from the user (step 120). A first temporary node is inserted into a start position of the first region and a second temporary node is inserted into an end position of the first region based on the received information of the first region (step 130).

Then, an ancestor node including the entirety of the first region is acquired using a function to get an ancestor node among the functions called at step 110 (step 140) and then descendant nodes included in the ancestor node are scanned until the first temporary node is found (step 150). Then, if the first temporary node is found during the scanning process, all descendant nodes after the first temporary node are extracted until the second temporary node is found (step 160).

In addition, each text node among the extracted nodes is edited by enclosing the text node within a pair of specific tags and assigning a first editing attribute corresponding to the first editing request to the pair of specific tags (170). Here, a pair of span tags may be used as the pair of tags enclosing the text node. A detailed description of a method for applying the first editing attribute to the text node is omitted herein since the method has already been described above in the explanation of the editing unit 22.

Finally, the first and second inserted temporary nodes are removed, thereby completing the editing of the selected text (step 180). On the other hand, if it is determined at step 100 that the web browser is IE, a class of functions for node extraction for IE is called (step 190). Thereafter, information of a first region that a user has selected for editing in a web document and an editing request for the first region are received from the user (step 200). Then, a temporary node in a source code format is inserted into each of the start and end positions of the first region based on the received information of the first region (step 210). The reason why a temporary node in a source code format is inserted in this process is that a web browser such as IE does not support a node insertion function, unlike FF, as described above.

Thereafter, a first identifier is assigned to the temporary node in a source code format to be inserted into the start position of the first region and a second identifier is assigned to the temporary node in a source code format to be inserted into the end position of the first region (step 220). Here, the purpose of assigning the first and second identifiers to the temporary nodes in a source code format is to recognize the temporary node in a source code format with the first identifier assigned thereto as the first temporary node and the temporary node in a source code format with the second identifier assigned thereto as the second temporary node. That is, the web document editing apparatus 10 recognizes the temporary nodes in a source code format as the first and second temporary nodes. Thereafter, the processes of steps 140 to 180 are performed to complete the editing of the web document.

In the web document editing method according to an embodiment of the present invention, it may be determined at step 160 or 250 whether or not a predetermined specific type of object is included in the extracted node and then a message indicating that the first editing request cannot be performed on the extracted node or a message indicating that a specific type of object is included in the selected node may be sent to the user if it is determined that the predetermined specific type of object is included.

Figure 8B:
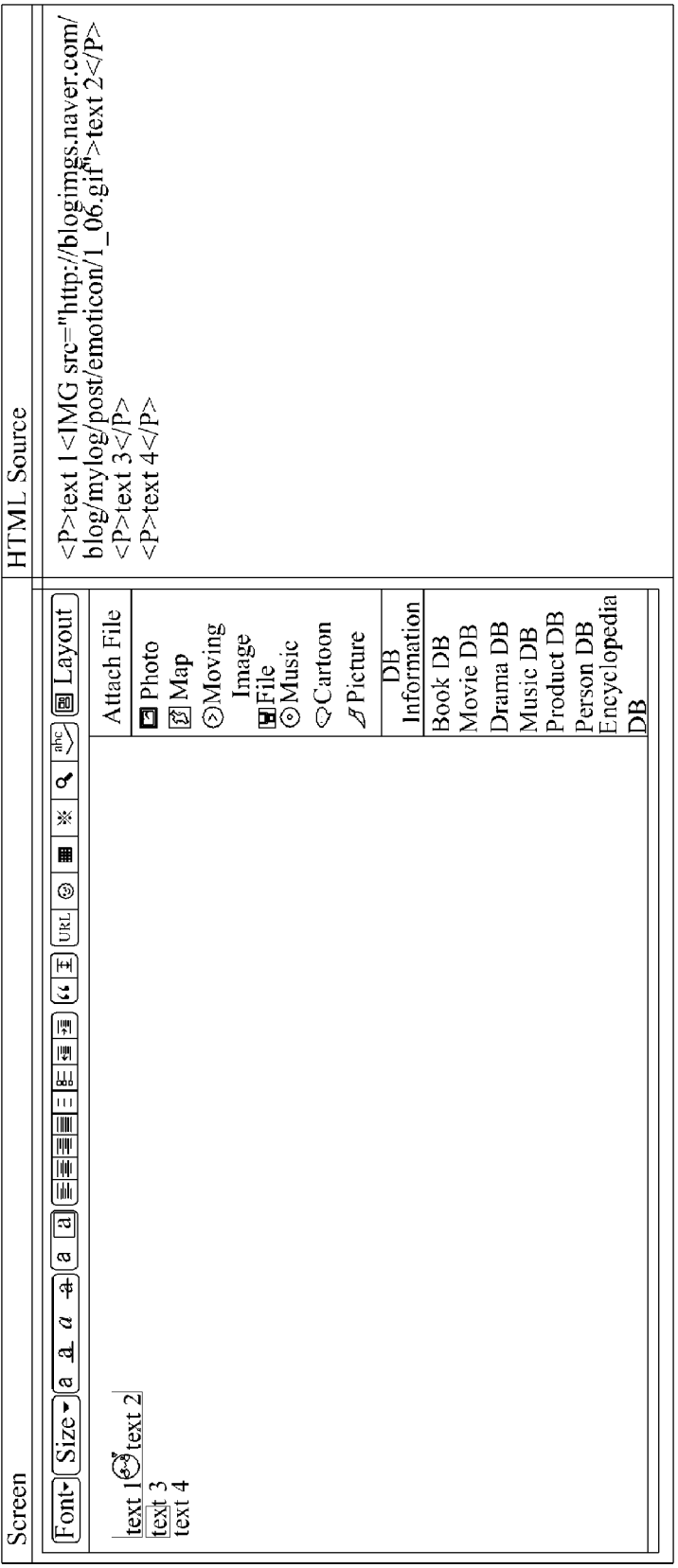
Figure 8C:
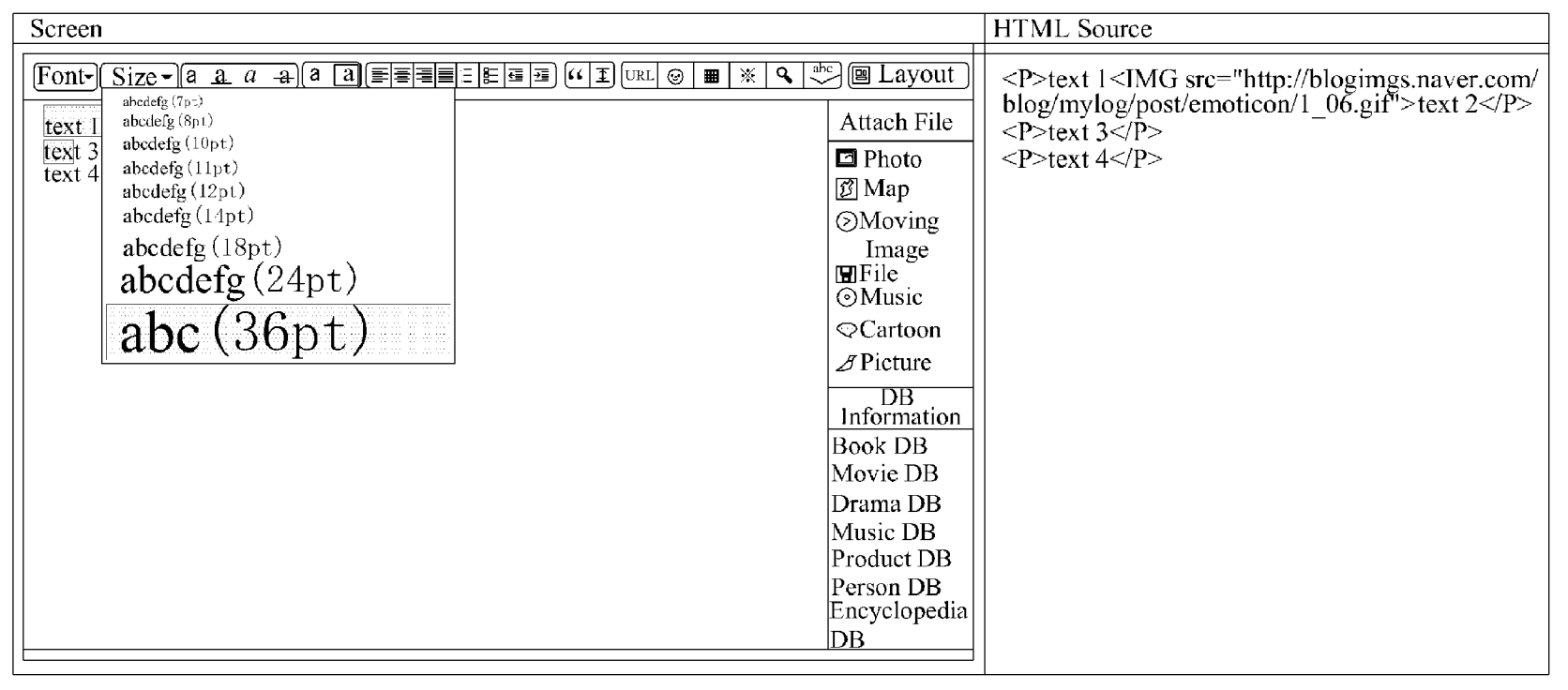
Figure 8D:
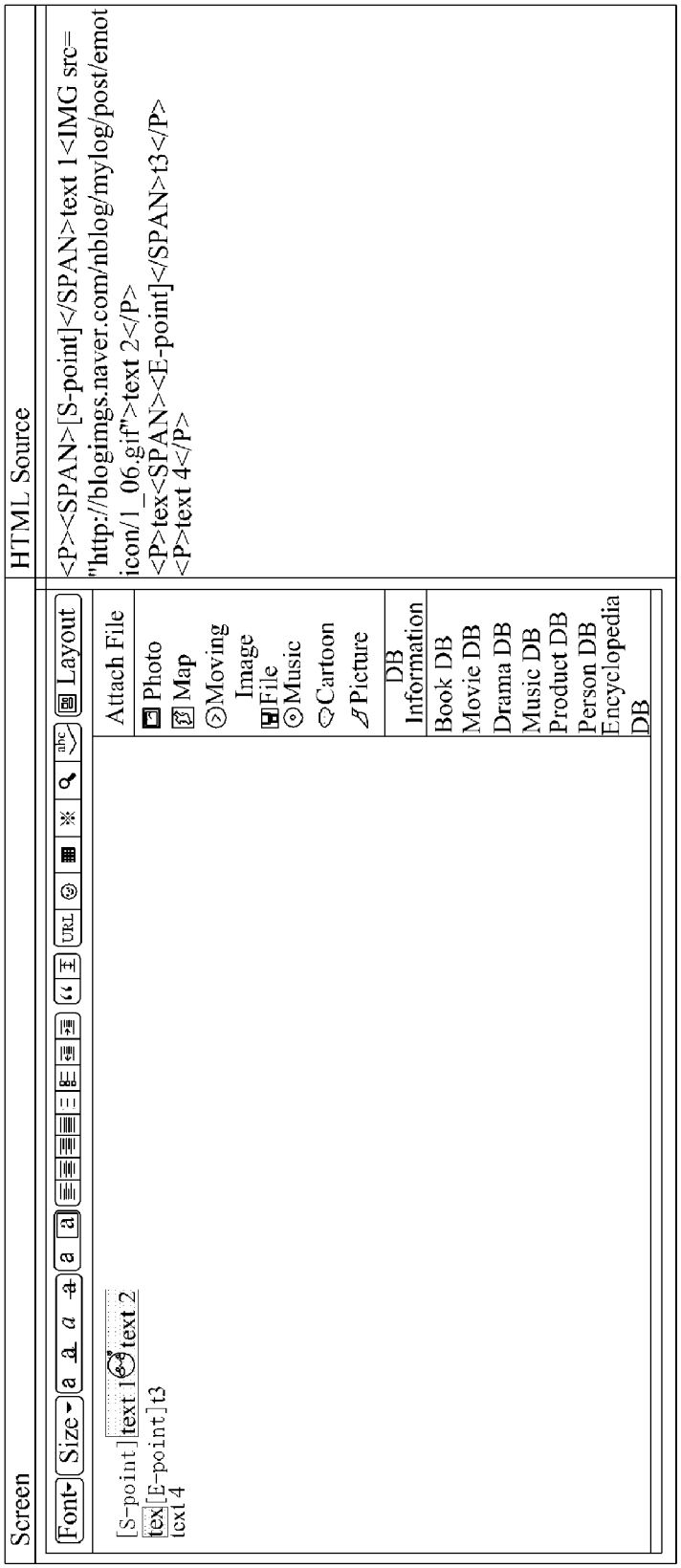

A procedure for actually editing a web document using the web document editing method described above will now be described in detail with reference to FIGS. 8A to 8F. First, when a user selects a specific text and image object as shown in FIG. 8B in a web document containing text and images as shown in FIG. 8A and then generates an editing request to change font size as shown in FIG. 8C, a first temporary node "[S-point]" is inserted into a start position of the selected region and a second temporary node "[E-point]" is inserted into an end position of the selected region as shown in FIG. 8D. It can be seen from an HTML source code shown in FIG. 8D that, as a result of the temporary node insertion, "<span>[S-point]</span>" is inserted as a first temporary node into the start position of a first region and "<span>[E-point]</span>" is inserted as a second temporary node into the end position of the first region. Through the insertion of the first and second temporary nodes, all nodes between the first and second temporary nodes become selected nodes to be extracted.

Figure 8E:
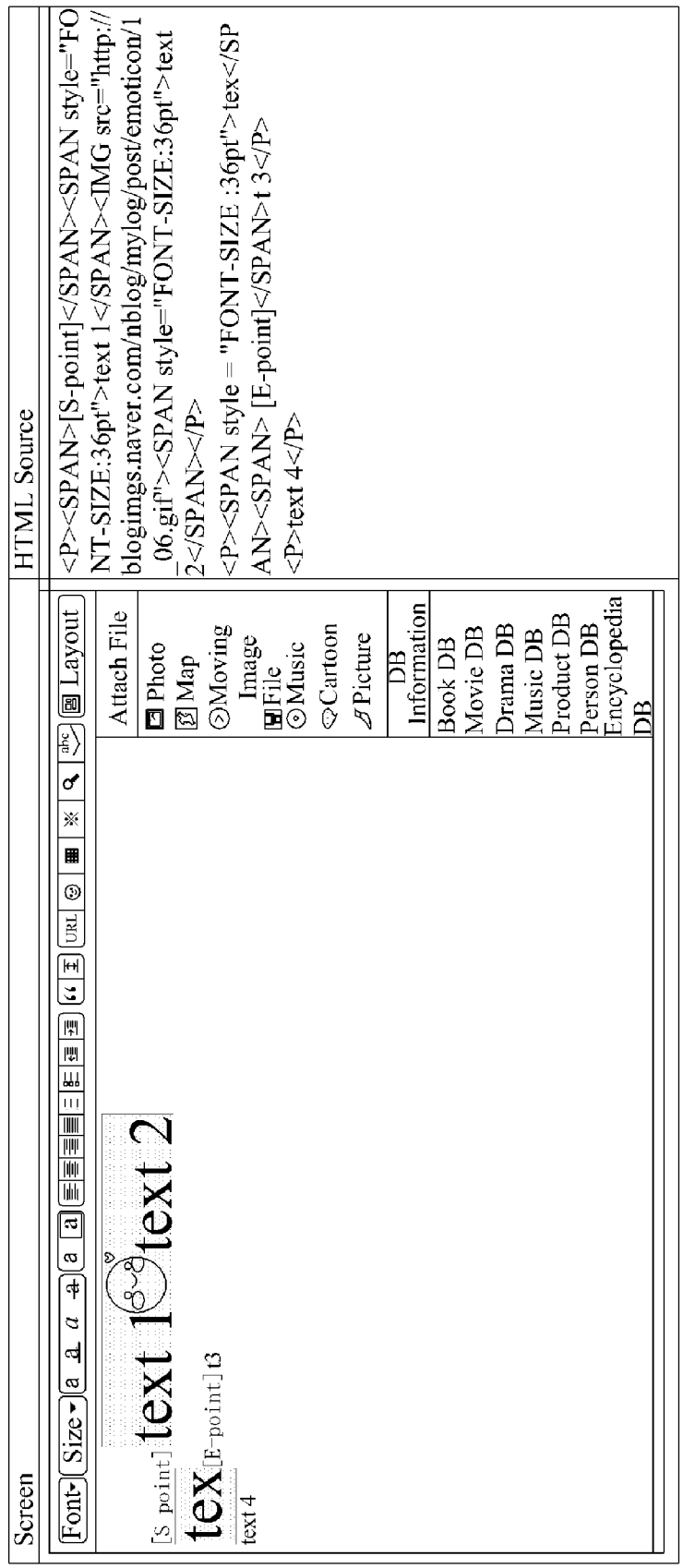
Figure 8F:
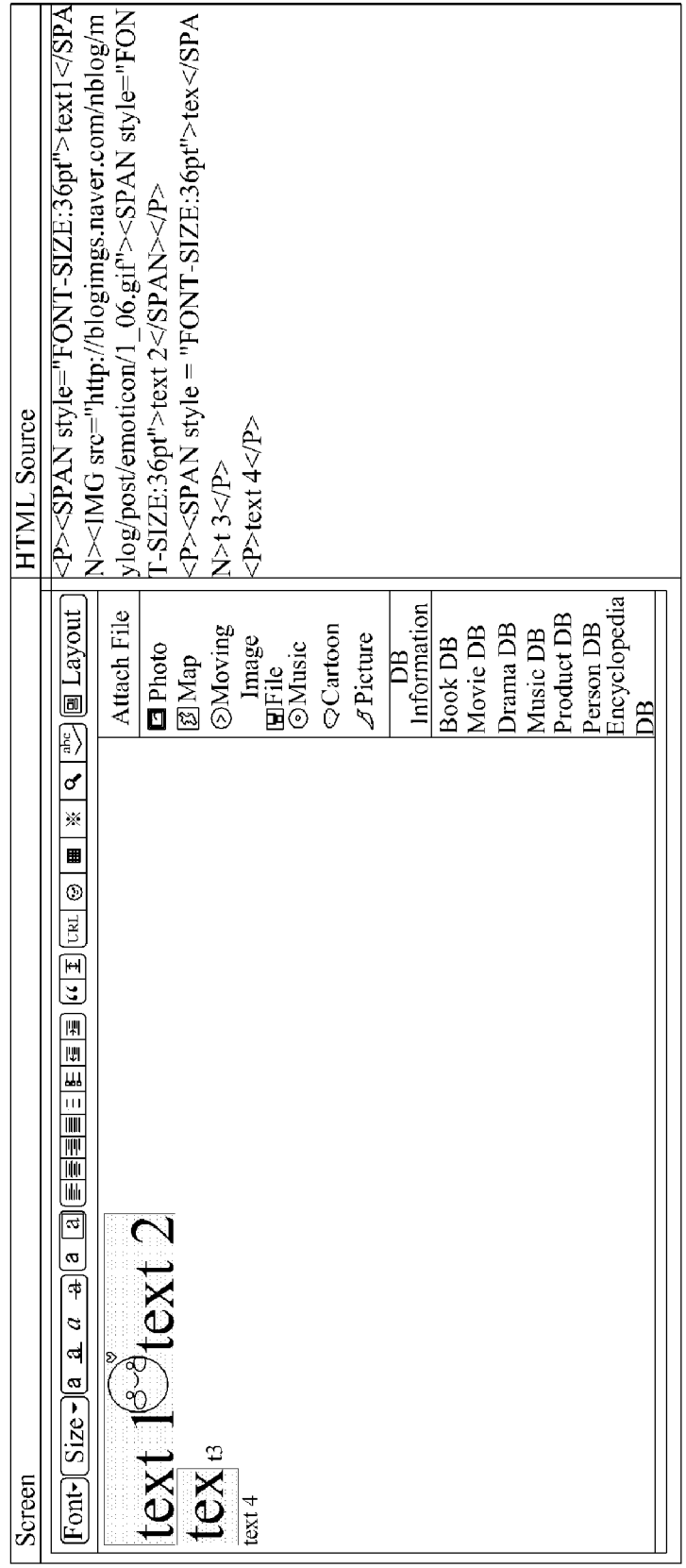

Then, as can be seen from an HTML source code shown in FIG. 8E, text nodes "text 1", "text 2", and "tex" among the extracted selected nodes are each enclosed within a pair of span tags and an editing attribute for changing the font size of the corresponding text node is assigned to each span tag to edit the selected text. Thereafter, the first and second inserted temporary nodes are removed to complete the text editing.

The web document editing method can be implemented in the form of a program that can be executed using a variety of computer means. The program for performing the web document editing method is stored in a computer-readable recording medium such as a hard disk, a CD-ROM, a DVD, ROM, RAM, or a flash memory.

FIGS. 9A to 9D illustrate source codes for implementing the web document editing method in the form of a program. Specifically, FIG. 9A illustrates a source code for determining the type of a web browser installed on a user terminal and calling and applying a function class commonly used by each web browser for node extraction or calling and applying a function class individually implemented for each web browser for node extraction.

FIG. 9B illustrates source codes for temporary node insertion and selected node extraction when the determined web browser type is FF. A first paragraph 30 is a source code for defining start and end positions of a first region, a second paragraph 32 is a source code for inserting a first temporary node into the start position of the first region using span tags, and a third paragraph 34 is a source code for inserting a second temporary node into the end position of the first region using span tags.

A fourth paragraph 36 is a source code for defining a node including both the first and second temporary nodes as an ancestor node and a fifth paragraph 38 is a source code for extracting selected nodes. Specifically, the fifth paragraph 38 is a source code for scanning all descendant nodes belonging to the ancestor node until the first temporary node is found and extracting and storing, if the first temporary node is found, all descendant nodes between the first and second temporary nodes until the second temporary node is found. A sixth paragraph 40 is a source code for removing the first and second inserted temporary nodes.

FIG. 9C illustrates source codes for temporary node insertion and selected node extraction when the determined web browser type is IE. The source code of FIG. 9C is similar to that of FIG. 9B, except that temporary nodes in a source code format rather than actual temporary nodes are inserted and the temporary nodes in a source code format are recognized as first and second temporary nodes. Thus, the following description is given only the differences between the source code of FIG. 9C and that of FIG. 9B.

First, a second paragraph 42 is a source code for inserting a temporary node in a source code format (hereinafter referred to as a "virtual temporary node") into a start position of a first region using span tags and a third paragraph 44 is a source code for inserting a virtual temporary node into an end position of the first region using span tags. Here, an individual identifier, different from those assigned to other nodes in the web document, is assigned to each virtual temporary node. In an embodiment, a first identifier is assigned to a virtual temporary node to be inserted into the start position of the first region and a second identifier is assigned to a virtual temporary node to be inserted into the end position of the first region.

A fourth paragraph 46 is a source code for recognizing the virtual temporary node with the first identifier assigned thereto as the first actual temporary node and recognizing the virtual temporary node with the second identifier assigned thereto as the second actual temporary node.

FIG. 9D illustrates a source code for providing, when a predetermined specific object is included in a selected node, the user with a warning message indicating that the specific object is included. Specifically, this source code is written to provide, when an object having a class name of "story photo" is included in a selected node, the user with a warning message "Story photo is selected". In a modified embodiment, a source code may be written to provide the user with a different warning message indicating that a specific editing request cannot be performed on a selected region.

As is apparent from the above description, the method and apparatus for editing web documents according to embodiments of the present invention has a variety of advantages. For example, the method and apparatus according to embodiments of the present invention maximizes user convenience since the method and apparatus directly acquires an object of a region, which a user has selected in a web document, to freely edit the object of the selected region.

In addition, the method and apparatus according to embodiments of the present invention can provide a variety of editing functions that have not been provided by web browsers since the method and apparatus directly acquires an object of a region, which a user has selected in a web document, to edit the object of the selected region. For example, the method and apparatus can adjust line spacing of a web document and can also adjust font size on a pixel basis.

Further, the method and apparatus according to embodiments of the present invention determines the type of each web browser installed on a user terminal during library initialization and calls an individual function class for each web browser. Thus, there is no need to determine the type of the web browser each time a function is executed, thereby minimizing the number of times the type of a web browser is determined.

Those skilled in the art will appreciate that embodiments of the present invention may be carried out in other specific ways than those set forth herein without departing from the spirit and essential characteristics of embodiments of the present invention.

For example, although the web document editing apparatus of embodiments of the present invention has been described as operating in conjunction with FF or IE among web browsers, the apparatus can also operate in conjunction with various other web browsers such as Netscape, Mozilla, Ican Browser, and Opera.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method that uses a processor to edit text using a web-based text editor, comprising:
    opening a document using a web-based text editor;
    receiving a first user input for selecting a block of text in the document;
    in reply to the first user input, inserting, using the processor, into a source code of the document, a first temporary node before the selected block and a second temporary node after the selected block;
    receiving a second user input for applying an attribute to the selected block; and
    in reply to the second user input, adding, using the processor, an attribute node between the first and second temporary nodes of the source code so as to apply the attribute to at least part of the block of the document.

2. The method of claim 1, further comprising:
    prior to adding, identifying the first and secondary temporary nodes in the source code.

3. The method of claim 2, wherein identifying comprises scanning the source code from before the first temporary node to after the second temporary node.

4. The method of claim 1, further comprising identifying a plurality of children nodes between the first and second temporary nodes.

5. The method of claim 4, wherein adding the attribute node comprises inserting the attribute node within each of the plurality of children nodes.

6. The method of claim 4, wherein adding the attribute node comprises replacing, with the attribute node, another attribute node included in one of the plurality of children nodes.

7. The method of claim 4, further comprising:
    removing, from one of the plurality of children nodes, another attribute node that is inconsistent with the attribute node.

8. The method of claim 1, further comprising:
    identifying a node to which the attribute cannot be applied; and
    generating a notification that the attribute cannot be applied to part of the selected block.

9. The method of claim 1, further comprising:
    deleting the first and second temporary nodes from the source code after completion of setting the attribute for the selected block.

10. The method of claim 1, wherein the attribute is selected from the group consisting of a font, a font size, italicization, underlining, bolding, coloring text, coloring background, line spacing, and alignment.

11. The method of claim 1, wherein the source code is in the HTML format.

12. The method of claim 1, wherein the first temporary node comprises a start or end tag.

13. The method of claim 1, wherein adding the attribute node comprises inserting at least one tag indicative of the attribute.

14. The method of claim 1, wherein the web-based text editor is run along with a web browser.

15. The method of claim 1, wherein the web browser is selected from the group consisting of Internet Explorer, Firefox, Mozilla, Safari, Netscape, Opera, Google Chrome, Ican Browser and AOL Explorer.

16. The method of claim 15, wherein inserting the first and second temporary nodes further comprises:
   determining which web browser is being run along with the web-based text editor; and
   causing to insert the first and second temporary nodes differently depending on determination.

17. The method of claim 1, further comprising sending the document to a remote server that operates a web-based text editing service.

18. A non-transitory computer readable storage medium comprising software configured to cause a computing terminal to perform editing text using a web-based text editor, the editing comprising the following steps:
   opening a document using a web-based text editor;
   receiving a first user input for selecting a block of text in the document;
   in reply to the first user input, inserting, into a source code of the document, a first temporary node before the selected block and a second temporary node after the selected block;
   receiving a second user input for applying an attribute to the selected block; and
   in reply to the second user input, adding an attribute node between the first and second temporary nodes of the source code so as to apply the attribute to at least part of the block of the document.

19. The non-transitory computer readable storage medium of claim 18, wherein the software is configured to be operated with a web browser.

20. The non-transitory computer readable storage medium of claim 18, wherein the software is configured to further cause the computing terminal to perform the following steps:
   identifying a plurality of children nodes between the first and second temporary nodes; and
   wherein adding the attribute node comprises replacing, with the attribute node, another attribute node included in one of the plurality of children nodes.

* * * * *